United States Patent
Lehtola

(10) Patent No.: US 10,247,220 B2
(45) Date of Patent: Apr. 2, 2019

(54) MOUNTING SCREW

(71) Applicant: KINGI OY, Nurmijärvi (FI)

(72) Inventor: Jari Lehtola, Espoo (FI)

(73) Assignee: KINGI OY, Nurmijärvi (FI)

( * ) Notice: Subject to any disclaimer, the term of this patent is extended or adjusted under 35 U.S.C. 154(b) by 103 days.

(21) Appl. No.: 15/042,755

(22) Filed: Feb. 12, 2016

(65) Prior Publication Data

US 2016/0238054 A1  Aug. 18, 2016

(30) Foreign Application Priority Data

Feb. 16, 2015  (EP) .................................... 15155165

(51) Int. Cl.
*F16B 25/00* (2006.01)
*F16B 25/10* (2006.01)

(52) U.S. Cl.
CPC ...... *F16B 25/0084* (2013.01); *F16B 25/0031* (2013.01); *F16B 25/0047* (2013.01); *F16B 25/106* (2013.01)

(58) Field of Classification Search
CPC .............. F16B 25/0047; F16B 25/0057; F16B 25/0068; F16B 25/106; F16B 25/0084
USPC .......................... 411/411, 413, 414
See application file for complete search history.

(56) References Cited

U.S. PATENT DOCUMENTS

| | | | |
|---|---|---|---|
| 2,242,758 A * | 5/1941 | Ruggieri | F16B 15/06 411/414 |
| 3,233,500 A * | 2/1966 | Devellier | F16B 25/0015 411/413 |
| 3,246,556 A | 4/1966 | Phipard, Jr. | |
| 3,643,543 A * | 2/1972 | Gutshall | F16B 25/0047 411/418 |
| 3,748,949 A | 7/1973 | Dreger | |
| 5,570,983 A * | 11/1996 | Hollander | F16B 25/0015 411/308 |
| 6,616,391 B1 * | 9/2003 | Druschel | F16B 25/0015 411/187 |
| 7,021,877 B2 * | 4/2006 | Birkelbach | F16B 25/0021 411/412 |
| 8,678,732 B2 * | 3/2014 | Balbo Di Vinadio | E05D 5/023 411/386 |
| 2008/0118332 A1 * | 5/2008 | Lamb | E04B 2/7457 411/411 |
| 2008/0226424 A1 | 9/2008 | Matthiesen et al. | |

(Continued)

FOREIGN PATENT DOCUMENTS

DE     52742 C     8/1889
DE  2 251 115 A1   4/1973

(Continued)

*Primary Examiner* — Flemming Saether
(74) *Attorney, Agent, or Firm* — Birch, Stewart, Kolasch & Birch, LLP

(57) ABSTRACT

A mounting screw (1), comprising a head part (2), a tip part (3), the tip part (3) having a tapered shape tapering from the shank part (4) to the tip (5) of the screw, and comprising a tip part thread (6), said tip part thread (6) extending to the very end of the tip (5). The mounting screw (1) further comprises a shank part (4) between the head part (2) and the tip part (3), the shank part (4) comprising a shank part thread (7), wherein the pitch (P1) of the shank part thread (7) is larger than the pitch (P2) of the tip part thread (6), and the thread root of the tip part (3) being frustoconical in its shape.

12 Claims, 4 Drawing Sheets

(56) References Cited

U.S. PATENT DOCUMENTS

| | | | |
|---|---|---|---|
| 2009/0010734 A1* | 1/2009 | Lin | F16B 23/0015 411/413 |
| 2009/0047096 A1 | 2/2009 | Lin et al. | |
| 2016/0208842 A1* | 7/2016 | Lin | F16B 25/0057 |

FOREIGN PATENT DOCUMENTS

| | | |
|---|---|---|
| EP | 0 281 203 A1 | 9/1988 |
| EP | 1 371 862 A1 | 12/2003 |
| EP | 1 970 576 A2 | 9/2008 |
| EP | 2 395 250 A1 | 12/2011 |
| EP | 2 700 829 A1 | 2/2014 |
| GB | 2 428 761 A | 2/2007 |
| GB | 2507142 A | 4/2014 |

* cited by examiner

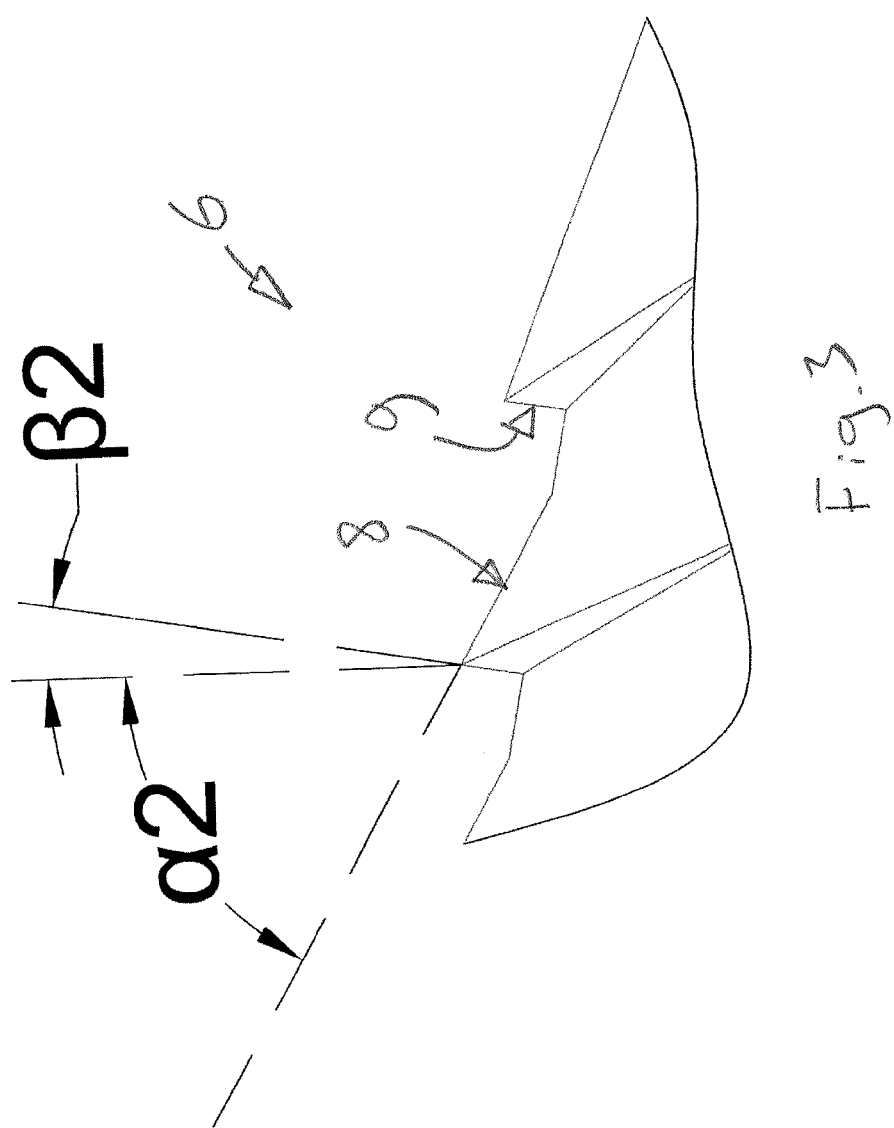

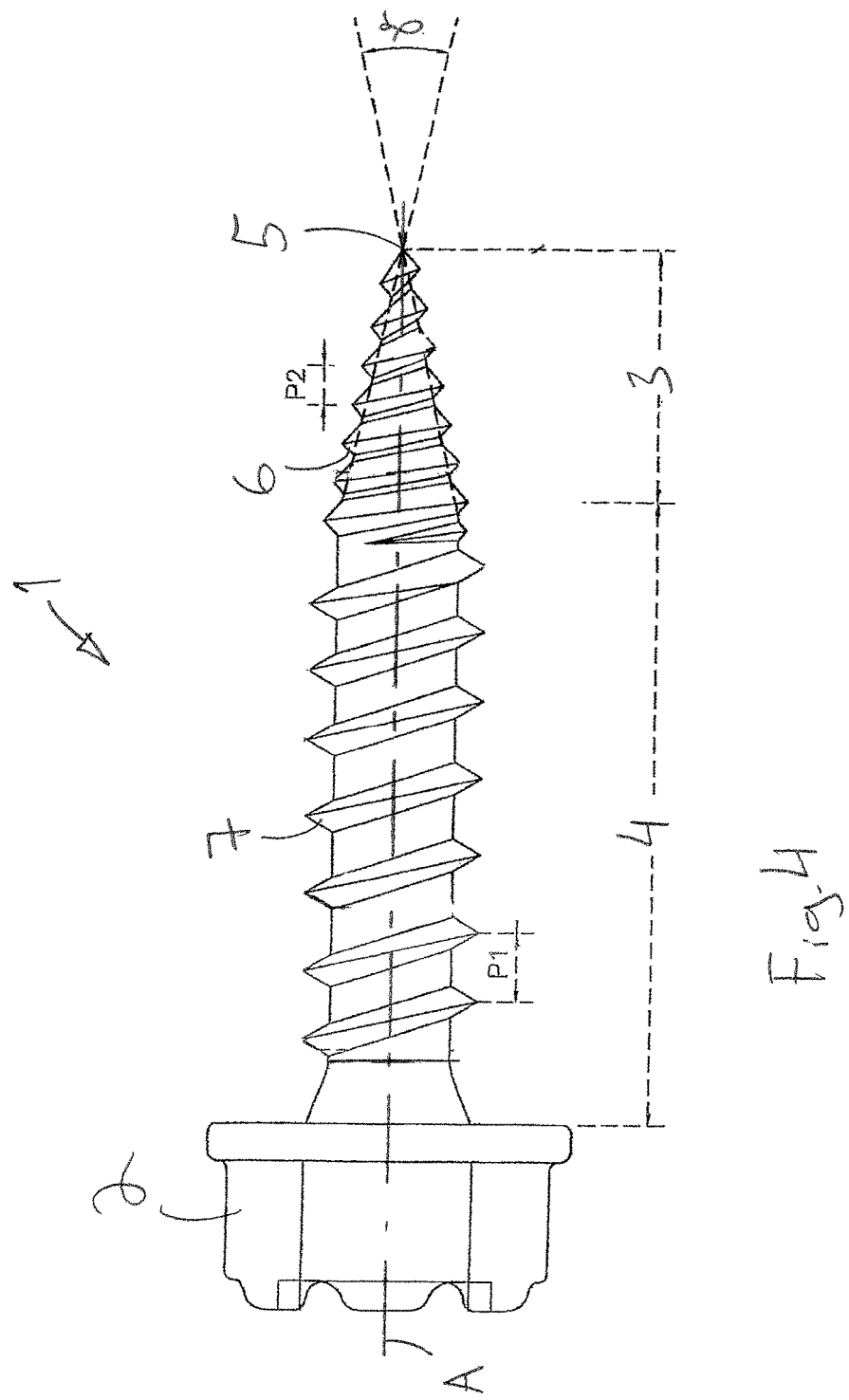

MOUNTING SCREW

BACKGROUND

The invention relates to a chipless thread-forming mounting screw and, in particular, to a thread-forming mounting screw for mounting metal sheets or similar products.

The products to be mounted are sheet metal products, such as profiles, wall cassettes, insulating panels, roofing sheets and sheet metal claddings.

The demand for easily and quickly mounted mounting screw is growing. This demand has come up especially by assemblers or fitters of sheet roofings, because installation time of sheet roofings substantially depends on features of mounting screws. However, known mounting screws do have some problems in this respect.

BRIEF DESCRIPTION

Viewed from a first aspect, there can be provided a mounting screw, comprising a head part, a tip part, the tip part having a tapered shape tapering from the shank part to the tip of the screw, and comprising a tip part thread, said tip part thread extending to the very end of the tip, the mounting screw further comprising a shank part between the head part and the tip part, the shank part comprising a shank part thread, wherein the pitch of the shank part thread is larger than the pitch of the tip part thread, and the thread root of the tip part being frustoconical in its shape.

Thereby easily and quickly mounted mounting screw may be achieved.

The mounting screw is characterised by what is stated in claim 1. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit subtasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF FIGURES

Some embodiments illustrating the present disclosure are described in more detail in the attached drawings, in which FIG. 3 is a schematic side view of another detail of the mounting screw shown in FIG. 1, and FIG. 4 is a schematic side view of another mounting screw.

In the figures, some embodiments are shown simplified for the sake of clarity. Similar parts are marked with the same reference numbers in the figures.

DETAILED DESCRIPTION

Figure 1:
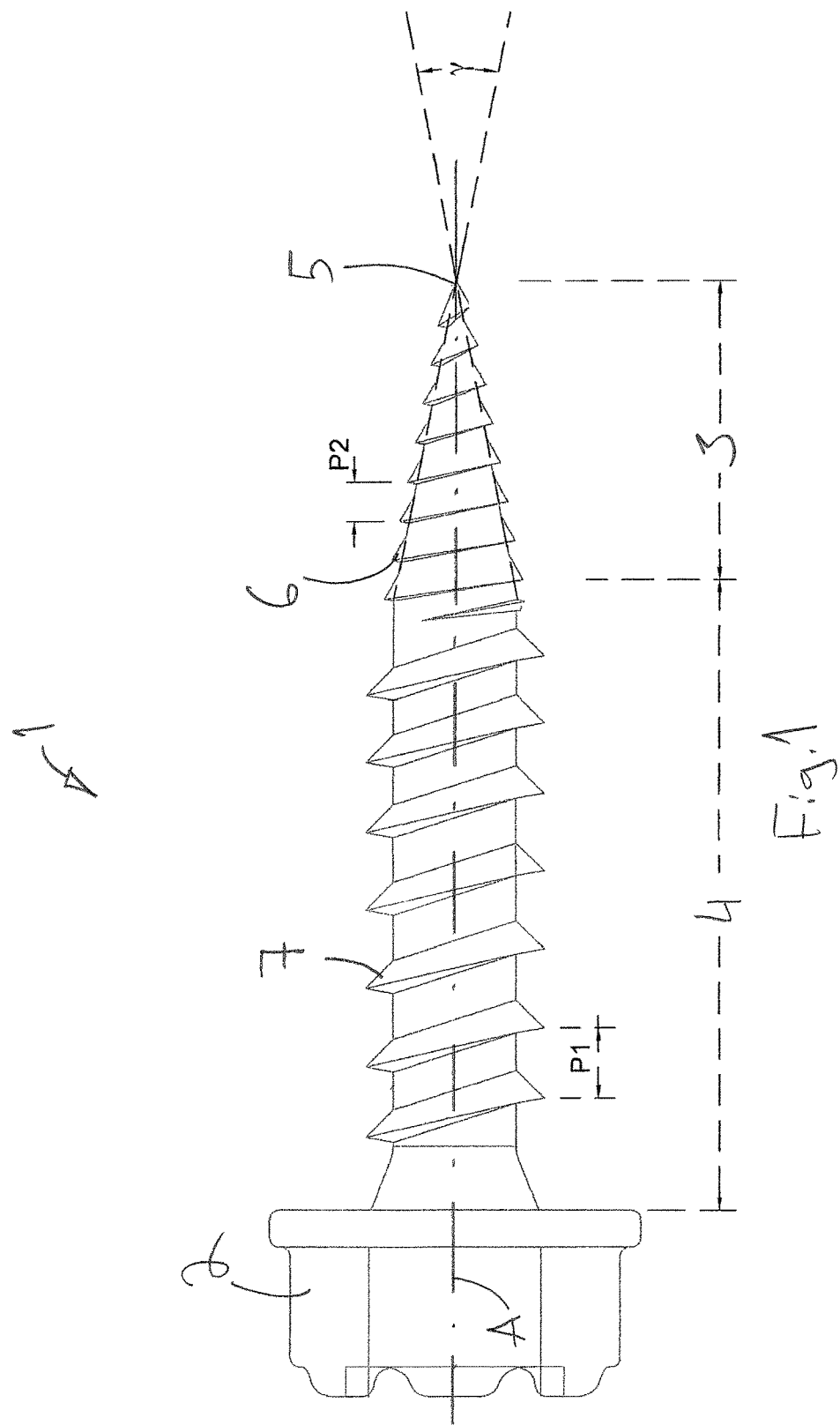
FIG. 1 shows schematically a side view of an example mounting screw.
Figure 2:
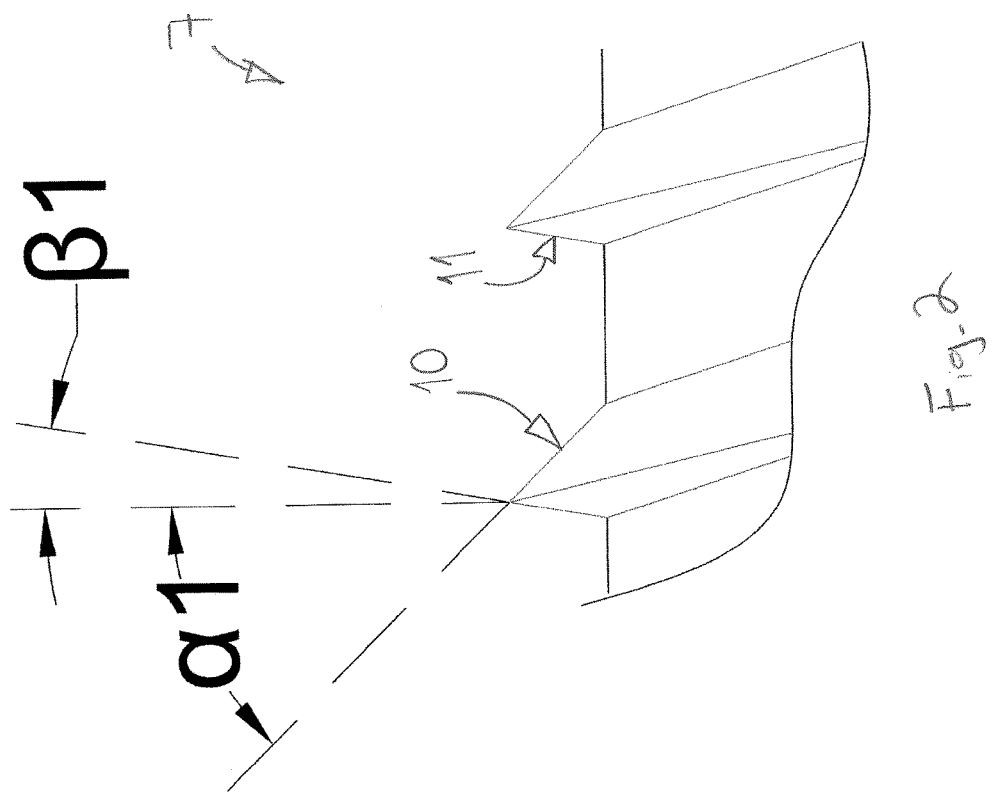
FIG. 2 is a schematic side view of a detail of the mounting screw shown in FIG. 1.

FIG. 1 shows schematically a side view of an example mounting screw, FIG. 2 is a schematic side view of a detail of the mounting screw shown in FIG. 1, and FIG. 3 is a schematic side view of another detail of the mounting screw shown in FIG. 1.

The mounting screw 1 comprises a head part 2, a tip part 3, and a shank part 4 arranged between the head part 2 and the tip part 3. The length of the shank part 4 and the tip part 3 is typically in range of 25 mm-80 mm.

The head part 2 comprises a hexagonal head, but alternatively, the head part 2 may comprise, for instance, a hex-socket, a torx-head, a crosshead or a slot-head or another type of head known per se.

The mounting screw 1 can be manufactured from any known screw material, e.g. materials having carbon steel as a basic material, e.g. SAE 1018 or SAE 1022 steel, or stainless steel or aluminium.

The screw 1 or at least part of it may comprise one or more layers of coating(s), e.g. paint-coating, corrosion resistant coating etc.

The shank part 4 comprises here a shank part thread 7 that extends to the head part 2. However, it is to be noted there may be an unthreaded part between the thread 7 and the head part 2.

The tip part 3 has a tapered or cone shape tapering from the shank part 4 to the tip 5 of the screw. The thread root of the tip part 3 has a frustoconical shape, the tapering angle of which is preferably selected in range of 15°-20°. An advantage of the frustoconical shape is that the screw 1 penetrates especially easily through at least two metal sheets arranged one on the other.

The tip part 3 comprises a tip part thread 6 that may extend to the very end of the tip 5 of the screw. The tip part thread 6 may comprise a single thread or a double thread. In an embodiment, there is a double threaded tip part thread 6 that extends to the tip part thread 6. An advantage of this embodiment is that the initial stage of the drilling can be quickened and the drilling of the screw into metal is facilitated.

The pitch P1 of the shank part thread 7 is larger than the pitch P2 of the tip part thread 6. An advantage of this embodiment is that the grip of the shank part thread in wood material can be improved, because there is more room between the threads. Furthermore, the fine thread in the tip part thread helps drilling into metal and reduces size of metal chips, if any.

According to an idea, the angle $\alpha 2$ of the leading edge of the tip part thread 6 to the normal of the axial direction A of the screw is in range of 45°-65°, whereas the angle $\beta 2$ of the trailing edge is in range of 10°-50°.

In one embodiment, the angle $\alpha 2$ of the leading edge is selected in range of 55°-65°, and the angle $\beta 2$ of the trailing edge is selected in range of 5°-15°. An advantage of this embodiment is that said angle $\alpha 2$ helps drilling into metal and said angle $\beta 2$ improves the grip of the tip part in wood material.

Thus, the angle $\alpha 2$ of the leading edge 8 of the profile of the tip part thread 6 to the normal of the axial direction A of the screw is larger than the angle $\beta 2$ of the trailing edge 9 of said profile and the profile of the tip part thread 6 is asymmetrical.

An advantage of this embodiment is that said angle $\alpha 2$ helps drilling into metal and said angle $\beta 2$ improves the grip of the tip part in wood material.

Furthermore, the height of the tip part thread 6 may be constant, as shown in FIG. 3. According to an idea, the height of the tip part thread 6 is in range of 0.2 mm-0.5 mm, preferably 0.2 mm-0.3 mm. The height in this range facilitates the drilling of the screw into metal.

Alternatively, the height of said thread 6 may be variable, being smaller near the tip 5, e.g. in range of 0 mm-1.0 mm, preferably 0 mm-0.5 mm from the tip 5, and being larger in the proximity of the shank part 4. An advantage of this embodiment is that the manufacturing of the tip part thread 6 may be easier.

The shank part 4 comprises a shank part thread 7, the profile of which may be symmetrical or asymmetrical. The diameter of the shank part 4, including the tread 7, may be e.g. in range of 2.5 mm-6.5 mm.

The profile of the shank part thread 7 comprises a leading edge 10 and a trailing edge 11. According to an idea, the angle $\alpha 1$ of the leading edge 10 to the normal of the axial direction A of the screw is in range of 25°-50°, and the angle $\beta 1$ of the trailing edge is in range of 10°-35°.

In one embodiment, the angle $\alpha 1$ is selected in range of 40°-50°, and the angle $\beta 1$ is selected in range of 10°-20°. An advantage of this embodiment is that said angle $\alpha 1$ helps drilling into metal and/or hard wood material, while said angle $\beta 1$ improves the grip of the shank part in wood material.

The height of the shank part thread 7 is typically constant. According to an idea, said height is in range of 1 mm-3 mm, typically 0.8 mm-1.0 mm.

Furthermore, the distance in axial direction A of two successive threads, i.e. the pitch P1 of the shank part thread 7, is in range of 1 mm-3 mm, preferably 1.2 mm-2.2 mm. The dimensions of the shank part thread 7 mentioned above facilitates drilling the screw into wood and, then, gripping the screw in wood material.

The shank part thread 7 may comprise a single thread or a double thread.

According to an idea, the profile of the tip part thread 6 relates to the profile of the shank part thread 7 so that $\alpha 1 < \alpha 2$. In other words, the angle $\alpha 1$ of the leading edge 10 of the shank part thread 7 is smaller than the angle $\alpha 2$ of the leading edge of the tip part thread 6. An advantage of this embodiment is that the tip may penetrate easily into metal and also the profile of the tip part thread 6 may be strong enough for enduring the forces caused by the drilling into metal.

According to an idea, the tip part thread 6 extends over the tapering or cone shaped tip part 3, but not on the shank part 4 which has a constant diameter. An advantage is that the penetration into metal and the grip in wood material are in especially good balance. According to an embodiment, the mounting screw 1 may comprise a wood cut, i.e. a type 17 thread cutting tip. This may facilitate drilling into hard wood material, e.g. in knags or in laminated wood, and, especially with large diameter screws, lowers probability to wood fracture.

FIG. 4 is a schematic side view of another mounting screw. The screw 1 may comprise tip part thread 6 and shank part thread 7 which both have a symmetrical profile. Alternatively, the tip part thread 6 may have an asymmetrical profile as disclosed in this description, while the shank part thread 7 has symmetrical profile, or vice versa.

According to an embodiment, the angle $\alpha 2$ of the leading edge of the tip part thread 6 is selected in range of 45°-50°, and the angle $\beta 2$ of the trailing edge of said tip part thread 6 is selected in range of 45°-50°.

In the embodiment shown in FIG. 4, the angles $\alpha 2$ and $\beta 2$ of the tip part thread 6 are 48° both. Thus, the profile of the tip part thread 6 is symmetrical. An advantage of this embodiment is that tools used for manufacturing the screw 1, especially screw-cutting tools, have longer lifetime, thus lowering manufacturing costs of the screw 1.

According to an embodiment, the angle $\alpha 1$ of the leading edge of the shank part thread 7 is selected in range of 25°-35°, and the angle $\beta 1$ of the trailing edge is selected in range of 25°-35°.

In the embodiment shown in FIG. 4, the angles $\alpha 1$ and $\beta 1$ of the shank part thread 7 are 30° both. Thus, the profile of the shank part thread 7 is symmetrical.

An advantage of this embodiment is that tools used for manufacturing the screw 1, especially screw-cutting tools, have longer lifetime, thus lowering manufacturing costs of the screw 1.

Also in the embodiment shown and described here in connection with FIG. 4, the tip part thread 6 may extend over the tapering or cone shaped tip part 3 only, but not on the shank part 4 which has a constant diameter. An advantage is that the penetration into metal and the grip in wood material are in especially good balance. The mounting screw 1 is especially advantageous to fasten a sheet metal product to a timber batten or joist. The mounting screw 1 is also advantageous to fasten a sheet metal product to a metal element. The sheet metal product may typically be for instance a roofing sheet, a wall sheet or another product made of metal.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 mounting screw
2 head part
3 tip part
4 shank part
5 tip of the screw
6 tip part thread
7 shank part thread
8 leading edge of the tip part thread
9 trailing edge of the tip part thread
10 leading edge of the shank part thread
11 trailing edge of the shank part thread
A axial direction
$\alpha 1$ angle of the leading edge of the shank part thread
$\alpha 2$ angle of the leading edge of the tip part thread
$\beta 1$ angle of the trailing edge of the shank part thread
$\beta 2$ angle of the trailing edge of the tip part thread
$\gamma$ taper angle
P1 pitch of the shank part thread
P2 pitch of the tip part thread
D diameter of the shank part

The invention claimed is:

1. A mounting screw, comprising:
a head part;
a shank part; and
a tip part, the shank part being between the head part and the tip part, the tip part having a tapered shape tapering from an end of the shank part to a tip of the screw, and comprising a tip part thread, said tip part thread extending to a distal end of the tip and being only formed on the tapered shape,
wherein:

the shank part comprises a shank part thread, a profile of each of the tip part thread and the shank part thread is defined with a leading edge facing the tip and a trailing edge facing the head part, an angle of the leading edge being defined as an angle of the leading edge to the normal of an axial direction of the screw, an angle of the trailing edge being defined as an angle of the trailing edge to the normal of the axial direction of the screw, in the profile of the shank part thread, the angle of the leading edge is in a range of 25°-50°, the angle of the trailing edge is in a range of 10°-35° and the angle of the leading edge is larger than the angle of the trailing edge, thereby the profile of the shank part thread being asymmetrical, the angle of the leading edge of the shank part thread is smaller than the angle of the leading edge of the tip part thread, and a pitch of the shank part thread is larger than a pitch of the tip part thread, and a thread root of the tip part thread being frustoconical in its shape.

2. The mounting screw as claimed in claim 1, wherein in a profile of the tip part thread, the angle of the leading edge is in a range of 45°-65°, and the angle of the trailing edge is in a range of 10°-50°.

3. The mounting screw as claimed in claim 2, wherein in the profile of the tip part thread, the angle of the leading edge is in a range of 45°-50°, and the angle of the trailing edge is in a range of 45°-50°.

4. The mounting screw as claimed in claim 2, wherein in the profile of the tip part thread, the angle of the leading edge is in a range of 55°-65°, and the angle of the trailing edge is in a range of 5°-15°.

5. The mounting screw as claimed in claim 1, wherein in a profile of the tip part thread, the angle of the leading edge of the profile is larger than the angle of the trailing edge of said profile, the profile of the tip part thread being thus asymmetrical.

6. The mounting screw as claimed in claim 1, wherein a height of the tip part thread is constant.

7. The mounting screw as claimed in claim 1, wherein a taper angle of the tip part is 15°-20°.

8. The mounting screw as claimed in claim 1, wherein the tip part thread is a double thread.

9. The mounting screw as claimed in claim 1, wherein an outer diameter of the shank part thread is 2.5 mm 6.5 mm.

10. The mounting screw as claimed in claim 1, wherein in the profile of the shank part thread, the angle of the leading edge is in a range of 25°-35°, and the angle of the trailing edge is in a range of 25°-35°.

11. The mounting screw as claimed in claim 1, wherein in the profile of the shank part thread, the angle of the leading edge is in a range of 40°-50°, and the angle of the trailing edge is in a range of 10°-20°.

12. The mounting screw as claimed in claim 1, wherein a height of the shank part thread is constant.

* * * * *